US011922813B2

United States Patent
Sakagawa et al.

(10) Patent No.: US 11,922,813 B2
(45) Date of Patent: Mar. 5, 2024

(54) ALERT CONTROL APPARATUS, MOVING BODY, ALERT CONTROL METHOD, AND COMPUTER-READABLE STORAGE MEDIUM

(71) Applicant: HONDA MOTOR CO., LTD., Tokyo (JP)

(72) Inventors: Yuta Sakagawa, Saitama (JP); Shigeru Inoue, Saitama (JP); Takahiro Kurehashi, Saitama (JP); Moriya Horiuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 21 days.

(21) Appl. No.: 17/830,338

(22) Filed: Jun. 2, 2022

(65) Prior Publication Data

US 2022/0392346 A1 Dec. 8, 2022

(30) Foreign Application Priority Data

Jun. 7, 2021 (JP) ................................ 2021-095304

(51) Int. Cl.
*G08G 1/16* (2006.01)
*G06V 20/58* (2022.01)

(52) U.S. Cl.
CPC .............. *G08G 1/16* (2013.01); *G06V 20/58* (2022.01)

(58) Field of Classification Search
CPC .................................. G08G 1/16; G06V 20/58
See application file for complete search history.

(56) References Cited

U.S. PATENT DOCUMENTS

| 11,180,159 | B1 * | 11/2021 | Post | B60W 50/14 |
| 2015/0070158 | A1 * | 3/2015 | Hayasaka | G01S 7/22 |
| | | | | 340/438 |
| 2016/0325676 | A1 * | 11/2016 | Yamada | G06V 20/58 |

(Continued)

FOREIGN PATENT DOCUMENTS

| CN | 107408288 A | 11/2017 |
| CN | 109583384 A | 4/2019 |

(Continued)

OTHER PUBLICATIONS

Office Action issued for counterpart Chinese Application 202210473468.7, issued by The State Intellectual Property Office of People's Republic of China dated May 18, 2023.

(Continued)

*Primary Examiner* — Mohamed Barakat

(57) ABSTRACT

An alert control apparatus includes: an alert control unit to issue a first alert to an occupant in a moving body if an object in a particular category is present within a region to which the moving body is headed, and issue a second alert to the occupant if an object in a category other than the particular category is present within the region; a reception control unit to perform, when the moving body enters a new movement section on a movement route, control for receiving a category of an object present within the new movement section from an external apparatus. If there is an object for which an alert is to be issued during movement within the new section, the alert control unit, based on the category received from the external apparatus, controls as to which of the first and second alerts is to be issued.

19 Claims, 9 Drawing Sheets

(56) References Cited

U.S. PATENT DOCUMENTS

| | | | |
|---|---|---|---|
| 2018/0012087 A1 | 1/2018 | Imbe | |
| 2021/0001841 A1* | 1/2021 | Wang | ............... B60W 50/08 |
| 2021/0027074 A1 | 1/2021 | Chiba | |

FOREIGN PATENT DOCUMENTS

| | | | |
|---|---|---|---|
| JP | 2008139320 A | 6/2008 |
| JP | 2009009281 A | 1/2009 |
| JP | 2010033346 A | 2/2010 |
| JP | 2017026537 A | 2/2017 |
| JP | 2018151714 A | 9/2018 |
| JP | 2019185105 A | 10/2019 |

OTHER PUBLICATIONS

Office Action issued for counterpart Japanese Application No. 2021-095304, issued by the Japanese Patent Office dated Jan. 4, 2023 (drafted on Dec. 16, 2022).

* cited by examiner

| TERMINAL ID | TIME | POSITION |
|---|---|---|
| 1111 | 2021-04-10 08:00 | (35,139) |
| 1111 | 2021-04-10 11:00 | (35,139) |
| 1111 | 2021-04-10 14:00 | (35,139) |
| . . . | . . . | . . . |

*FIG.3*

| TERMINAL ID | CATEGORY |
|---|---|
| 1111 | STUDENT |
| 2222 | NON-STUDENT |
| ⋮ | ⋮ |

FIG.4

ALERT CONTROL APPARATUS, MOVING BODY, ALERT CONTROL METHOD, AND COMPUTER-READABLE STORAGE MEDIUM

The contents of the following Japanese patent application(s) are incorporated herein by reference:
NO. 2021-095304 filed on Jun. 7, 2021.

BACKGROUND

1. Technical Field

The present invention relates to an alert control apparatus, a moving body, an alert control method, and a computer-readable storage medium.

2. Related Art

With respect to navigation functions for a pedestrian, a wheelchair, and/or a bicycle, patent document 1 discloses sending a radio communication request included in route guidance data when it is determined that a position or area has been reached for which the radio communication request should be made.

PRIOR ART DOCUMENT

Patent Document 1: Japanese Patent Application Publication No. 2018-151714

BRIEF DESCRIPTION OF THE DRAWINGS

FIG. 3 shows the data structure of position history information of terminals 82 that is collected by an MEC server 52.

FIG. 4 shows the data structure of category information of terminals 82 that is managed by the MEC server 52.

DESCRIPTION OF EXEMPLARY EMBODIMENTS

The following describes the present invention by referring to embodiments thereof. However, the embodiments described hereinafter do not limit the invention as in the claims. Not all of the combinations of features described in the embodiments are necessarily essential for the solution of the invention.

Figure 1:
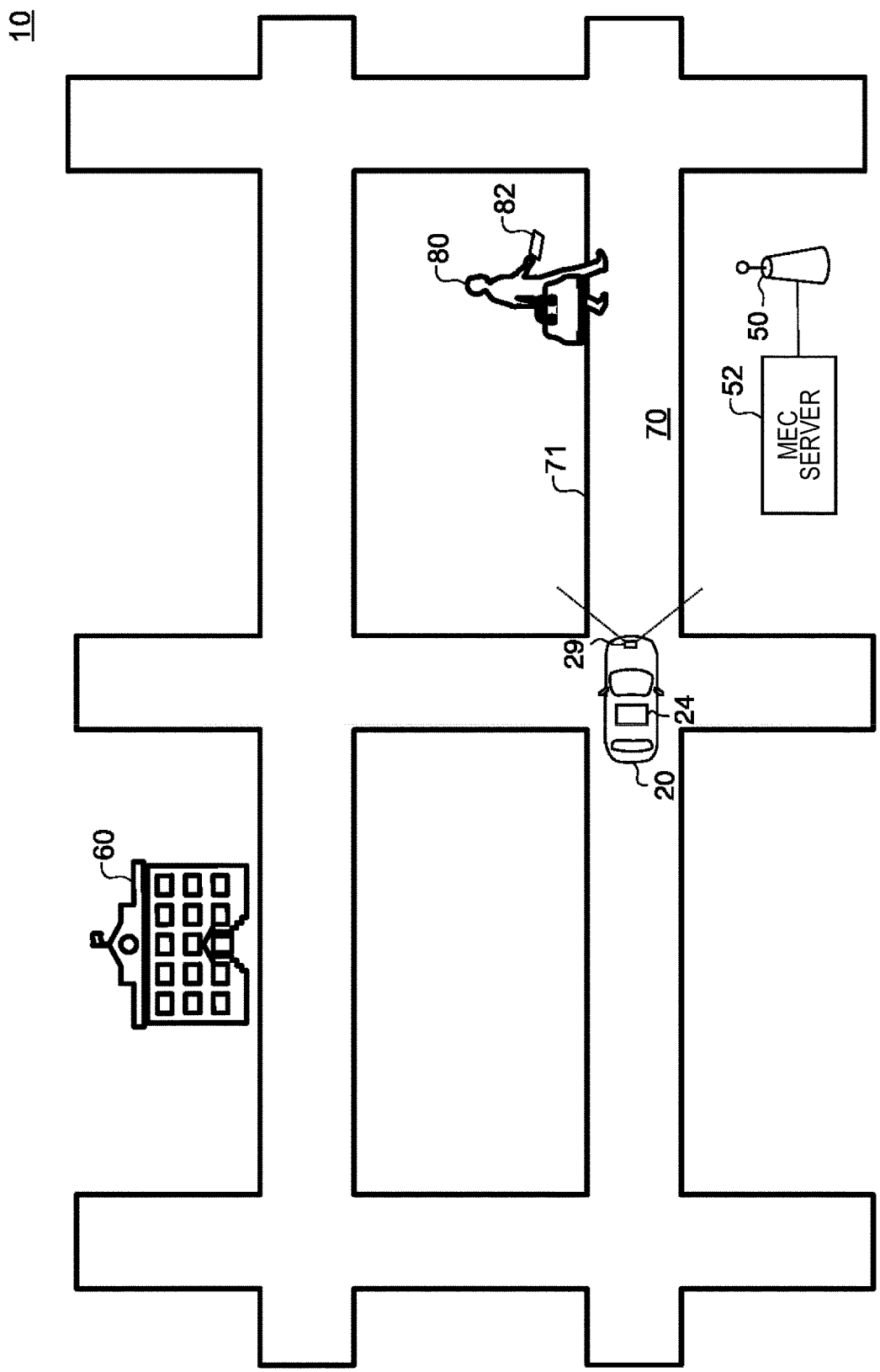
FIG. 1 schematically shows a situation in which an alert system 10 is used.

FIG. 1 schematically shows a situation in which an alert system 10 is used. The alert system 10 includes a vehicle 20, a base transceiver station 50, and an MEC server 52. The vehicle 20 is an example of a moving body. The MEC server 52 is an example of an "external apparatus."

The MEC server 52 is a mobile edge computing server. The MEC server 52 continuously collects position information of terminals 82. When a terminal 82 is present within the site of a school 60 for a certain period of time or longer, the MEC server 52 determines, on the basis of the history of position information of the terminal 82, that the owner of the terminal 82 is a student, and maps "student" to identification information of the terminal 82 as category information. On the basis of a query from the vehicle 20, the MEC server 52 provides the vehicle 20 with the position information of the terminal 82, to which the category information of "student" has been mapped.

The vehicle 20 includes a control apparatus 24 and a sensor 29. The sensor 29 can capture an image of a region forward of the vehicle 20. When the vehicle 20 passes an intersection on a road 70 and enters a new travel section 71, the control apparatus 24 of the vehicle 20 inquires with the MEC server 52 about whether a student is present within the travel section 71. If a student is present within the travel section 71, the control apparatus 24 receives position information of "student" from the MEC server 52. The MEC server 52 provides the control apparatus 24 with the position information of a terminal 82 to which "student" has been mapped as category information.

The control apparatus 24 detects the presence of a person 80 by performing image recognition processing for an image captured by the sensor 29. If a person 80 is detected in the vicinity of a student's position received from the MEC server 52, the control apparatus 24 issues a first alert to the occupant of the vehicle 20. If a person is detected at a position distant from a student's position received from the MEC server 52, the control apparatus 24 issues a second alert, which is weaker than the first alert, to the occupant of the vehicle 20.

As a general rule, students often go home by foot or bicycle at nightfall or night. It is more difficult to recognize a pedestrian or a bicycle at nightfall or night than in the daytime. The alert system 10 allows the presence of a student to be grasped in advance so that an alert can be appropriately issued. Accordingly, traffic safety can be enhanced. It should be noted that "student" is a concept including kindergarten pupil, nursery school pupil, elementary school student, junior high-school student, high school student, and college or university student.

Figure 2:
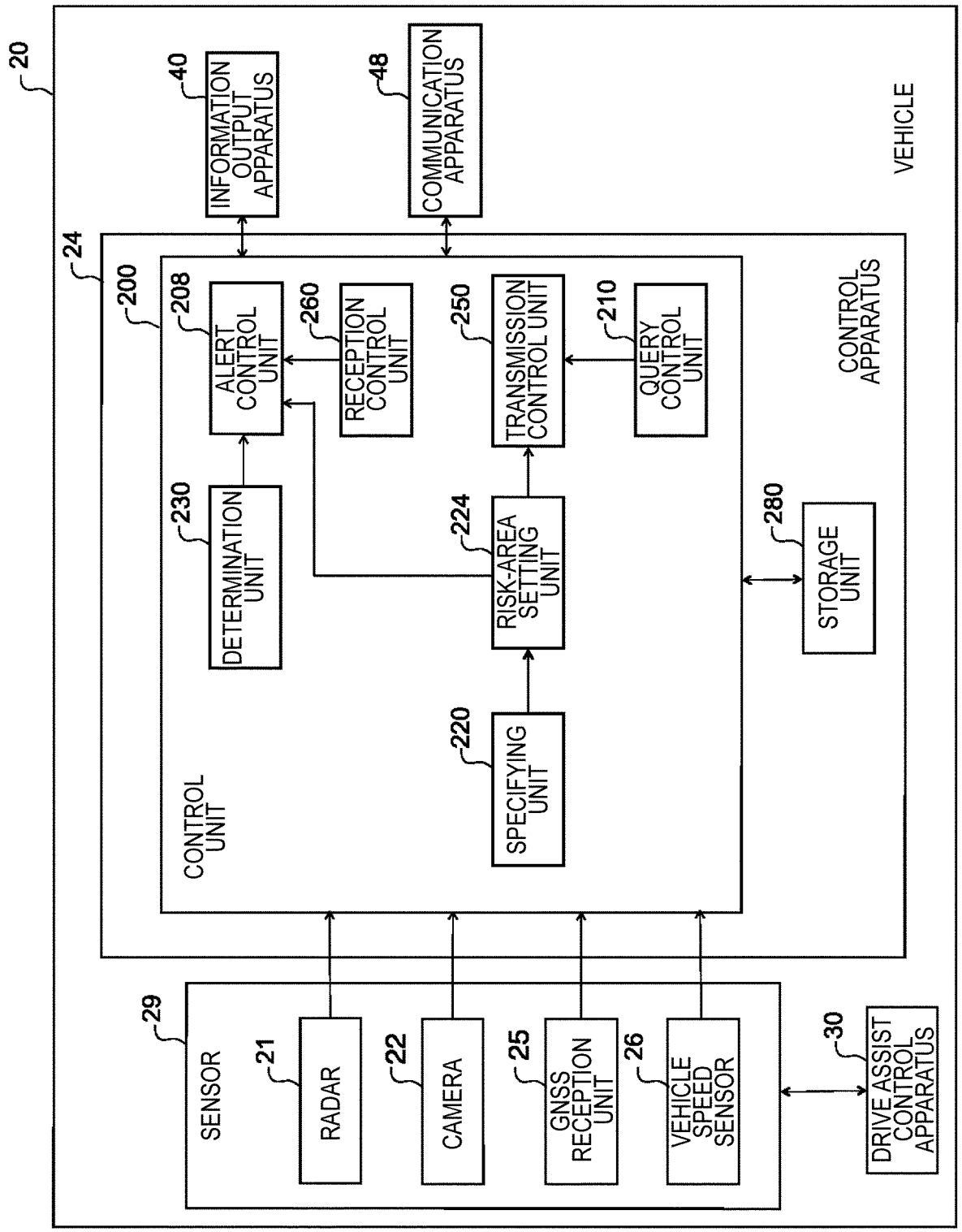
FIG. 2 shows the system configuration of a vehicle 20.

FIG. 2 shows the system configuration of the vehicle 20. The vehicle 20 includes the sensor 29, the control apparatus 24, a communication apparatus 48, an information output apparatus 40, and a drive assist control apparatus 30. The control apparatus 24 is an example of an "alert control apparatus."

The sensor 29 includes a radar 21, a camera 22, a GNSS reception unit 25, and a vehicle speed sensor 26. The radar 21 may be, for example, a LiDAR or a millimeter-wave radar. The radar 21 may be used to acquire distance information of a distance to an object. The GNSS reception unit 25 receives radio waves sent from a GNSS satellite. The GNSS reception unit 25 generates information indicating the current position of the vehicle 20 on the basis of a signal received from the GNSS satellite. The camera 22 is an example of an image capturing unit equipped in the vehicle 20. The camera 22 generates image information by capturing an image of the vicinity of the vehicle 20. For example, the camera 22 may generate image information by capturing an image in the direction in which the vehicle 20 is headed. The camera 22 may be a monocular camera. The camera 22 may be a compound-eye camera that can acquire distance information of a distance to an object. The sensor 29 may include a position sensor such as an odometer, and an inertial measurement unit (IMU) such as an acceleration sensor or an attitude sensor.

The drive assist control apparatus 30 provides drive assistance for the vehicle 20 by using information detected by the sensor 29. The drive assist control apparatus 30 may be implemented by an ECU having the functions of advanced driver-assistance systems (ADAS).

The communication apparatus 48 communicates with a terminal 82. For example, the communication apparatus 48 may perform radio communication with the terminal 82 via a PC5 interface. The communication apparatus 48 communicates with the MEC server 52 via the base transceiver station 50.

The information output apparatus 40 outputs alert information. The information output apparatus 40 may have a human-machine-interface (HMI) function. The information output apparatus 40 may include a head-up display and a navigation system.

The control apparatus 24 includes a control unit 200 and a storage unit 280. For example, the control unit 200 may be implemented by a circuit such as an arithmetic processing unit including a processor. The storage unit 280 includes a nonvolatile storage medium. The control unit 200 performs processing by using information stored by the storage unit 280. The control unit 200 may be implemented by an electronic control unit (ECU) provided with a microcomputer including, for example, a CPU, a ROM, a RAM, an I/O, and a bus.

The control unit 200 includes a specifying unit 220, a risk-area setting unit 224, a query control unit 210, a determination unit 230, a transmission control unit 250, a reception control unit 260, and an alert control unit 208. Information detected by the sensor 29 is input to the control unit 200.

The alert control unit 208 issues a first alert to the occupant in the vehicle 20 if an object in a particular category is present within a region to which the vehicle 20 is headed, and issues a second alert to the occupant if an object in a category other than the particular category is present within a region to which the vehicle 20 is headed. When the vehicle 20 enters a new movement section on a movement route, the reception control unit 260 performs control for receiving the category of an object present within the new movement section from the MEC server 52, which determines the categories of objects on the basis of movement history information of terminals 82. On the basis of an image acquired by an image capturing apparatus equipped in the vehicle 20, the determination unit 230 determines whether there is an object for which an alert is to be issued while the vehicle 20 moves within the new movement section. If the determination unit 230 determines that there is an object for which an alert is to be issued during movement within the new section, the alert control unit 208 performs, on the basis of the category received from the MEC server 52, control as to which of the first and second alerts is to be issued.

When the vehicle 20 enters a new movement section, the reception control unit 260 performs control for receiving, from the MEC server 52, the position and category of a terminal 82 within the new movement section. The determination unit 230 determines, on the basis of an image, whether an object for which an alert is to be issued is present at the position received from the MEC server 52. If the determination unit 230 determines that an object for which an alert is to be issued is present at the position received from the MEC server 52, the alert control unit 208 performs, on the basis of the category received from the MEC server 52, control as to which of the first and second alerts is to be issued.

The specifying unit 220 specifies an area that cannot be recognized from an image acquired by the camera 22. The area that cannot be recognized from an image acquired by the camera 22 cannot be viewed from the position of the vehicle 20 or from the position at which the camera 22 is provided. For example, an area that cannot be viewed may be an area in which occlusion has occurred due to this area being shielded by a three-dimensional object, such as a building or another vehicle 20 that has been stopped, when viewed from the position of the vehicle 20. The specifying unit 220 may specify a non-viewable area on the basis of image information and map information. The specifying unit 220 may receive position information of a non-viewable area transmitted from an external apparatus such as another vehicle 20 or the base transceiver station 50, and specify the non-viewable area on the basis of the received position information of the non-viewable area.

The risk-area setting unit 224 specifies, on the basis of the position and category of a terminal 82 received from the MEC server 52, the category of an object present at a position within an area specified by the specifying unit 220, and sets, on the basis of the specified category, a risk area in which an object that approaches the vehicle 20 may be present. Note that a particular category is student. If the category of the object present at a position within the area specified by the specifying unit 220 is a particular category, the risk-area setting unit 224 sets a wide risk area on the basis of the position and category of a terminal 82 received from the MEC server 52. If an object for which an alert is to be issued is present within the risk area, the alert control unit 208 issues the first or second alert on the basis of the category. If an object in a particular category is present within the risk area, the alert control unit 208 issues the first alert, which is stronger than the second alert. As a general rule, students can move quickly. Hence, safety can be enhanced by setting a wide risk area for an area in which a student is present.

When the vehicle 20 enters a new movement section, the query control unit 210 controls a transmission of query information for inquiring with the MEC server 52 about whether an object in a particular category is present within the new movement section. If it is determined, on the basis of response information for the query information, that an object in a particular category is present within the new movement section, the reception control unit 260 performs control for continuously receiving the position of the object in the particular category. If it is determined, on the basis of response information for the query information, that an object in a particular category is present within the new movement section, the reception control unit 260 may make a request for the MEC server 52 to continuously transmit the position of the object in the particular category. If it is determined, on the basis of response information for the query information, that an object in a particular category is present within the new movement section, the reception control unit 260 may continuously make a request for the MEC server 52 to transmit the position of the object in the particular category.

The reception control unit 260 performs control for receiving response information for risk area information. The alert control unit 208 performs control for outputting alert information at least to the inside of the vehicle 20 on the basis of response information. For example, the alert control unit 208 may notify the occupant of the vehicle 20 of alert information via the information output apparatus 40.

When the information output apparatus 40 includes a head-up display, the alert control unit 208 may cause the head-up display to output light for displaying alert information for the occupant of the vehicle 20. When the information output apparatus 40 includes a sound output apparatus for outputting alert information by sound, the alert control unit 208 may cause alert information to be output by sound. The alert control unit 208 may communicate with a mobile terminal carried by the occupant of the vehicle 20 so as to cause alert information to be output from the mobile terminal.

FIG. 3 shows the data structure of position history information of terminals 82 that is collected by the MEC server 52. The MEC server 52 maps a terminal ID, which is identification information of a terminal 82, a time at which position information was collected, and the position of the terminal 82 to each other, and stores the result as position history information. For example, the position of the terminal 82 may be latitude-longitude information.

FIG. 4 shows the data structure of category information of terminals 82 that is managed by the MEC server 52. The MEC server 52 maps terminal IDs and categories to each other and stores the result. The category "student" indicates that it has been determined that the owner of a terminal 82 is a student. The category "non-student" indicates that it has been determined that the owner of a terminal 82 is not a student. When it is determined, on the basis of position history information, that a terminal 82 has been located within the site of the school 60 for a period longer than a preset period, the MEC server 52 determines that the owner of the terminal 82 is a "student," and sets "student" as the category of category information, with this category mapped to the terminal ID of the terminal 82. The determination whether the owner of a terminal 82 is a student may be made each day, or may be made on the basis of position history information acquired for latest days set in advance.

Figure 5:
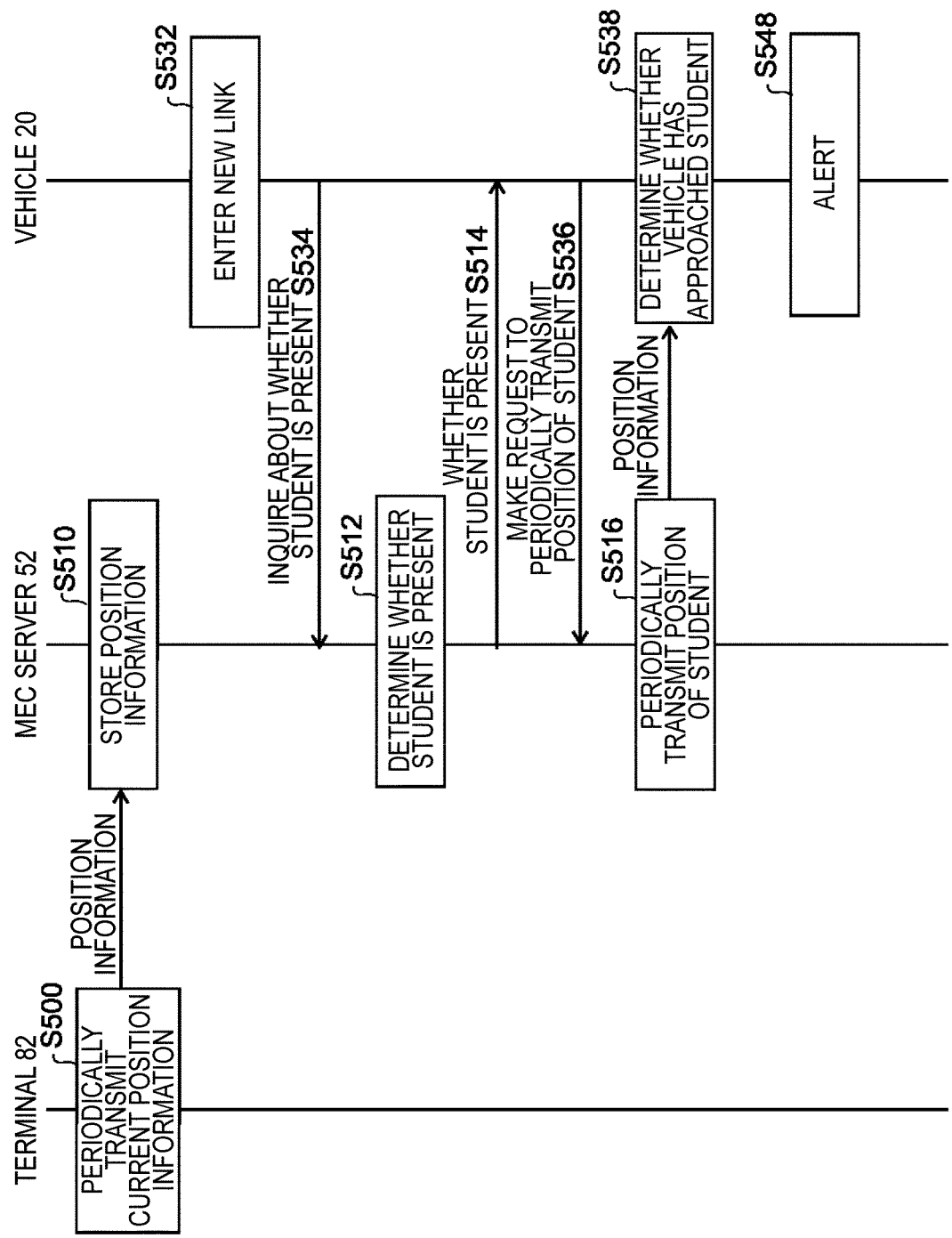
FIG. 5 schematically shows the flow of overall processing performed by terminals 82, the MEC server 52, and the vehicle 20 in the alert system 10.

FIG. 5 schematically shows the flow of overall processing performed by terminals 82, the MEC server 52, and the vehicle 20 in the alert system 10.

In S500, the terminals 82 periodically transmit current position information to the MEC server 52. In S510, the MEC server 52 stores the current position information. On the basis of periodically transmitted position information, the MEC server 52 updates the current position information of the terminals 82 to the latest position information.

When the query control unit 210 determines, in S532 on the basis of the current position information of the vehicle 20 and road information, that the vehicle 20 has entered a new travel section 71, the query control unit 210 inquires, in S534 via the transmission control unit 250, with the MEC server 52 about whether a student is present within the travel section 71. In S512, the MEC server 52 refers to the latest current position information of the terminals 82 and the category information of the terminals 82, and determines that a student is present within the travel section 71 if the position range of the travel section 71 includes the current position of a terminal 82 having a terminal ID to which the category "student" has been mapped. In S514, the MEC server 52 transmits, to the control apparatus 24, information indicating whether a student is present.

In S536, if the vehicle 20 receives, from the MEC server 52, information to the effect that a student is present within the travel section 71, the reception control unit 260 transmits, to the MEC server 52, request information for making a request to periodically transmit position information of the student. Upon receipt of the request information from the control apparatus 24, in S516, the MEC server 52 starts to periodically transmit latest current position information of the terminal 82. In S538, the determination unit 230 determines, on the basis of the position information periodically received from the MEC server 52, whether it has been determined that the vehicle 20 has approached the student. For example, in a case where a person is detected from an image captured by the camera 22, if the person is detected near the position of the student transmitted from the MEC server 52, the determination unit 230 may determine that the vehicle 20 has approached the student. If it is determined that the vehicle 20 has approached the student, the alert control unit 208 issues an alert to the occupant of the vehicle 20 in S548.

Figure 6:
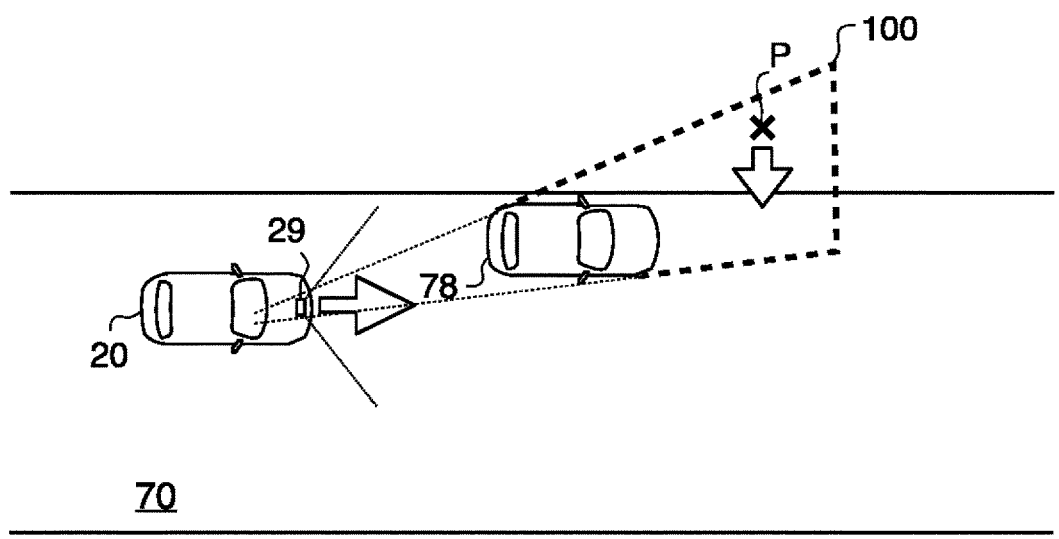
FIG. 6 schematically shows an example of a non-viewable area specified by a specifying unit 220.

Control pertaining to a non-viewable area is described with reference to FIGS. 6, 7, and 8. FIG. 6 schematically shows an example of a non-viewable area specified by the specifying unit 220. If a vehicle 78 is parked on a road 70, an area 100, which is located on a far side of the vehicle 78 in the direction in which the vehicle 20 is headed, is blocked by the vehicle 78 and thus cannot be viewed from the position of the vehicle 20. The specifying unit 220 specifies the area 100 as a non-viewable area. If a pedestrian is present within the non-viewable area, the pedestrian could run into the road and approach the vehicle 20.

Assuming, for example, that a pedestrian is present at a point P and walks toward the road 70 at a certain speed, if the pedestrian arrives at the road 70 at a timing at which the vehicle 20 arrives at the position of the risk area 100 in the direction in which the vehicle 20 is headed, it can be considered that the pedestrian is highly likely to approach the vehicle 20. The risk-area setting unit 224 sets, as a risk area, an area in which a pedestrian who will arrive at the road 70 before the vehicle 20 arrives at the risk area 100 could possibly be present.

Figure 7:
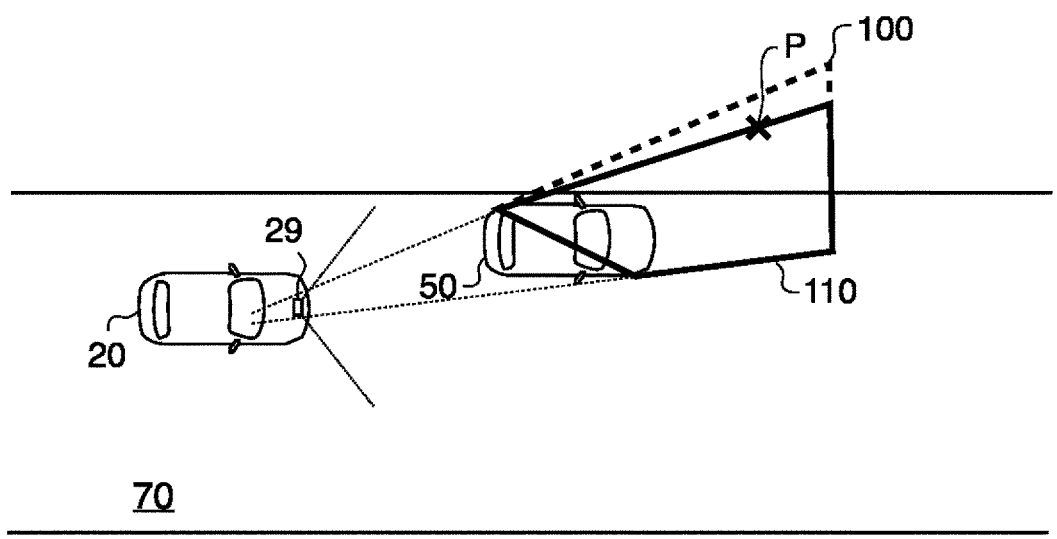
FIG. 7 schematically shows a risk area 110 set by a risk-area setting unit 224.

FIG. 7 schematically shows a risk area 110 set by the risk-area setting unit 224. The risk area 110 includes at least a portion of the area 100. Upon the risk-area setting unit 224 setting the risk area 110, the transmission control unit 250 transmits risk area information, including position information of the risk area 110, without designating a destination. For example, the transmission control unit 250 may transmit the risk area information by broadcast. The position information of the risk area may include latitude-longitude coordinates of the risk area 110. For example, the position information of the risk area may include the latitude-longitude coordinates of a vertex of the risk area 110.

Upon receipt of the risk area information, a terminal 82 determines, on the basis of the position information included in the risk area information, whether the current position of the terminal 82 is included in the risk area. When determining that the current position of the terminal 82 is included in the risk area, the terminal 82 notifies the owner of the terminal 82 of this fact via the HMI function of the terminal 82. Consequently, an alert can be issued to the person present within the risk area.

If it is determined that a student is present within the area 100 on the basis of the current position information of the student periodically transmitted from the MEC server 52, the risk-area setting unit 224 sets a wide risk area 110 for the area 100. Students can move quickly. Hence, if a student is present within the area 100, traffic safety can be enhanced by setting a wide risk area.

Figure 8:
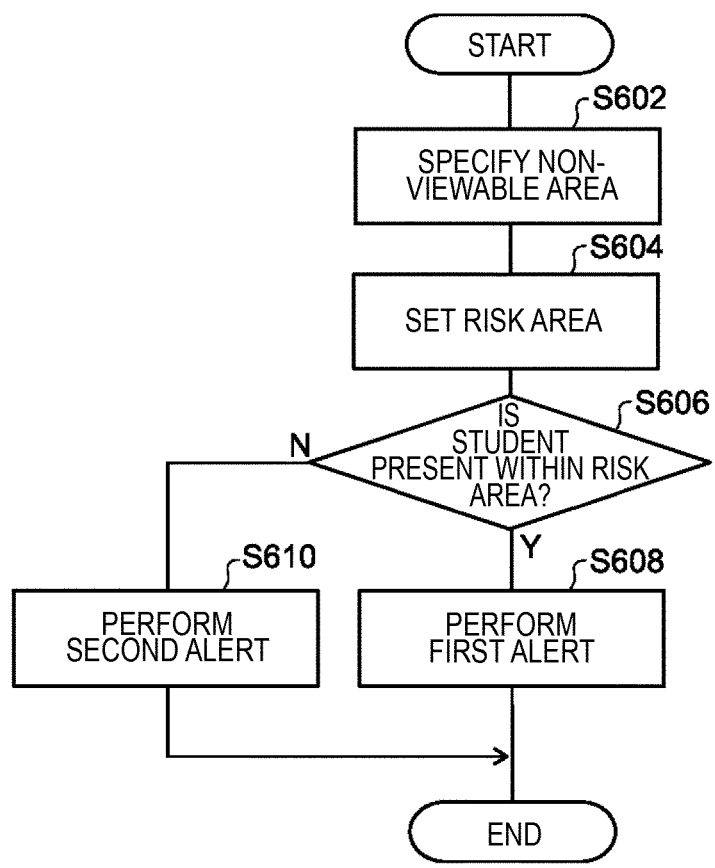
FIG. 8 shows a flowchart pertaining to a control method performed by a control apparatus 24.

FIG. 8 shows a flowchart pertaining to a control method performed by the control apparatus 24. The processes of the flowchart start when a non-viewable area is detected.

In S602, the specifying unit 220 specifies a non-viewable area. For example, the specifying unit 220 may specify a non-viewable area according to image information captured by the camera 22. Alternatively, the specifying unit 220 may specify a known non-viewable area on the basis of map information including obstacle information. The specifying unit 220 may specify a non-viewable area on the basis of non-viewable-area information delivered from another vehicle that has detected the non-viewable area. The specifying unit 220 may specify a non-viewable area on the basis of non-viewable-area information delivered via the base transceiver station 50.

In S604, the risk-area setting unit 224 sets a risk area within the non-viewable area. The risk-area setting unit 224 sets a risk area by using the technique described above with reference to FIGS. 7 and 8. In S606, the alert control unit 208 determines, on the basis of current position information of students periodically transmitted from the MEC server 52, whether a student is present within the risk area set in S604. If a student is present within the risk area, a first alert is performed (S608). If no students are present within the risk area, a second alert is performed (S610).

The first alert may have a greater strength than the second alert. The first alert may include a process of issuing an alert to the occupant of the vehicle 20 by sound and by using a display. The second alert may include a process of issuing an alert to the occupant of the vehicle 20 only by using a display. The first and second alerts may include an alerting process performed by transmitting risk area information to a terminal 82. The risk area information may include information indicating an alert level. When issuing the first alert, the alert control unit 208 may incorporate information indicating a first alert level into risk area information. When issuing the second alert, the alert control unit 208 may incorporate information indicating a second alert level, which is lower than the first alert level, into risk area information. When having received risk area information including information indicating the first alert level, a terminal 82 may issue an alert to the owner of the terminal 82 by sound and vibration. When having received risk area information including information indicating the second alert level, a terminal 82 may issue an alert to the owner of the terminal 82 only by either sound or vibration.

The communication between the control apparatus 24 and a terminal 82 is performed through direct communication. For example, the control apparatus 24 may perform direct communication with the terminal 82 through short distance direct communication according to Cellular-V2X. The short distance direct communication according to Cellular-V2X includes communication schemes such as LTE-V2X PC5 and 5G-V2X PC5 (denoted by "PC5" in present embodiments). A form using Wi-Fi (registered trademark) and/or dedicated short range communications (DSRC) as direct communication may be used. The control apparatus 24 may communicate with a terminal 82 via the MEC server 52. Aside from Cellular-V2X and DSRC (registered trademark), any direct communication scheme, such as Bluetooth (registered trademark), may be used for direct communication. The control apparatus 24 may perform direct communication with a terminal 82 by using communication infrastructures of an intelligent transport system (ITS).

The alert system 10 described above allows the presence of a student to be grasped in advance so that an alert can be appropriately issued. Accordingly, traffic safety can be enhanced.

The vehicle 20 is an example of a transport machine. Transport machines include automobiles such as passenger vehicles and buses, saddled vehicles, bicycles, and the like. Aside from persons, moving bodies include transport machines, including automobiles such as passenger vehicles and buses, saddled vehicles, bicycles, and the like.

Figure 9:
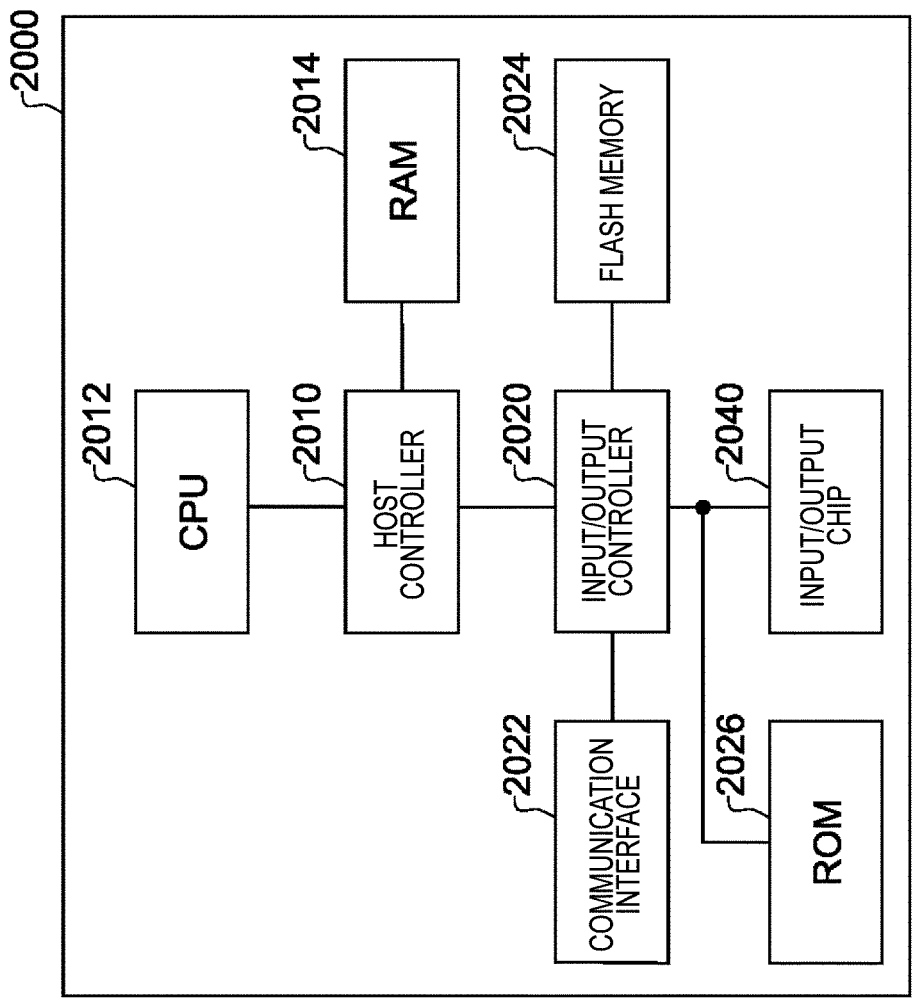
FIG. 9 shows an example of a computer 2000.

FIG. 9 shows an example of a computer 2000 that may entirely or partially implement a plurality of embodiments of the present invention. A program installed in the computer 2000 can allow the computer 2000 to: function as apparatuses such as the control apparatus 24 according to embodiments or components of the apparatuses; perform operations associated with the apparatuses or components of the apparatuses; and/or perform processes according to embodiments or steps in the processes. Such a program may be executed by a CPU 2012 to cause the computer 2000 to perform certain operations associated with the processing procedures described herein and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and a HDMI (registered trademark) port.

A program is provided via a network or a computer-readable medium such as a CD-ROM, a DVD-ROM, or a memory card. The RAM 2014, the ROM 2026, or the flash memory 2024 is an example of the computer-readable medium. Programs are installed in the flash memory 2024, the RAM 2014, or the ROM 2026 and executed by the CPU 2012. The information processing described in these programs is read into the computer 2000, resulting in cooperation between a program and the above-mentioned various types of hardware resources. An apparatus or method may be constituted by realizing the operation or processing of information in accordance with the usage of the computer 2000.

For example, when communication is performed between the computer 2000 and an external device, the CPU 2012 may execute a communication program loaded onto the RAM 2014 to instruct communication processing to the communication interface 2022, based on the processing described in the communication program. The communication interface 2022, under control of the CPU 2012, reads transmission data stored on transmission buffering regions provided with recording media such as the RAM 2014 and the flash memory 2024, and transmits the read transmission data to a network and writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may perform various types of processing on the data read from the RAM 2014, which includes various types of operations, processing of information, condition judging, conditional branch, unconditional branch, search/replace of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer-readable medium on or near the computer 2000. A recording medium such as a hard disk or a RAM provided with a server system connected to a dedicated communication network or the Internet can be used as the computer-readable media. A program stored in the computer-readable medium may be provided to the computer 2000 via a network.

Programs that are installed in the computer 2000 and cause the same to function as the control unit 200 may contact the CPU 2012 or the like so as to cause the computer 2000 to function as each unit of the control unit 200. The information processing described in these programs is read into the computer 2000 so as to function as each unit of the control unit 200, which is constituted by specific means in which software and the above-mentioned various types of hardware resources cooperate with each other. By using these specific means, information computation or processing corresponding to purposes of use of the computer 2000 in the present embodiment can be realized, thereby building a particular control unit 200 corresponding to the purposes of use.

Various embodiments have been described by referring to the block diagrams and the like. Each block in the block diagrams may represent (1) steps of processes in which operations are performed or (2) sections of apparatuses responsible for performing operations. Certain steps and sections may be implemented by dedicated circuitry, programmable circuitry supplied with computer-readable instructions stored on computer-readable medium, and/or processors supplied with computer-readable instructions stored on computer-readable medium. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable medium may include any tangible device that can store instructions for execution by a suitable device, such that the computer-readable medium having instructions stored therein forms at least a portion of an article of manufacture including instructions which can be executed to create means for performing processing operations or operations specified in the block diagrams. Examples of computer-readable medium may include an electronic storage medium, a magnetic storage medium, an optical storage medium, an electromagnetic storage medium, a semiconductor storage medium, etc. More specific examples of computer-readable medium may include a floppy (registered trademark) disc, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing described processing operations or operations specified in the block diagrams. Examples of processors include computer processors, processing units, microprocessors, digital signal processors, controllers, microcontrollers, etc.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: Alert system; 20: Vehicle; 21: Radar; 22: Camera; 24: Control apparatus; 25: GNSS reception unit; 26: Vehicle speed sensor; 29: Sensor; 30: Drive assist control apparatus; 40: Information output apparatus; 48: Communication apparatus; 50: Base transceiver station; 52: MEC server; 60: School; 70: Road; 71: Travel section; 80: Person; 82: Terminal; 100, 110: Area; 200: Control unit; 208: Alert control unit; 210: Query control unit; 220: Specifying unit; 224: Risk-area setting unit; 230: Determination unit; 250: Transmission control unit; 260: Reception control unit; 280: Storage unit; 2000: Computer; 2010: Host controller; 2012: CPU; 2014: RAM; 2020: Input/output controller; 2022: Communication interface; 2024: Flash memory; 2026: ROM; 2040: Input/output chip

What is claimed is:

1. An alert control apparatus comprising:
   at least one processor;
   an alert control unit configured to issue a first alert if an object in a particular category is present within a region to which a moving body is headed, and issue a second alert if an object in a category other than the particular category is present within the region to which the moving body is headed, using the at least one processor;
   a reception control unit configured to perform, when the moving body enters a new movement section on a movement route, control for receiving a category of an object present within the new movement section from an external apparatus for determining categories of objects on a basis of movement history information of terminals, using the at least one processor; and
   a determination unit configured to determine, on a basis of an image acquired by an image capturing apparatus equipped in the moving body, whether there is an object for which an alert is to be issued while the moving body is moving within the new movement section, using the at least one processor, wherein
   when the moving body enters the new movement section, the reception control unit is configured to perform control for receiving, from the external apparatus, a position and a category of the terminal within the new movement section,
   the determination unit is configured to determine, on a basis of the image, whether an object for which an alert is to be issued is present at the position received from the external apparatus, and
   if the determination unit determines that an object for which an alert is to be issued is present at the position received from the external apparatus, the alert control unit is configured to perform, on a basis of the category received from the external apparatus, control as to which of the first and second alerts is to be issued.

2. The alert control apparatus according to claim 1, further comprising:
   a specifying unit configured to specify an area incapable of being recognized from an image, using the at least one processor; and
   a risk-area setting unit configured to specify, on a basis of the position and the category of the terminal received from the external apparatus, a category of an object present at a position within the area specified by the specifying unit, and set, on a basis of the specified category, a risk area in which an object that approaches the moving body is possibly present, using the at least one processor, wherein
   if an object for which an alert is to be issued is present within the risk area, the alert control unit is configured to issue the first or second alert on a basis of the category.

3. The alert control apparatus according to claim 2, wherein
   the risk-area setting unit is configured to set a wide risk area on a basis of the position and the category of the terminal received from the external apparatus if the category of the object present at the position within the area specified by the specifying unit is the particular category.

4. The alert control apparatus according to claim 3, wherein
   the particular category is student.

5. The alert control apparatus according to claim 1, further comprising:
   a query control unit configured to control, when the moving body enters the new movement section, a transmission of query information for inquiring with the external apparatus about whether an object in the particular category is present within the new movement section, using the at least one processor, wherein
   if it is determined, on a basis of response information for the query information, that an object in a particular category is present within the new movement section, the reception control unit is configured to perform control for continuously receiving a position of the object in the particular category.

6. The alert control apparatus according to claim 5, wherein
   if it is determined, on a basis of response information for the query information, that an object in a particular category is present within the new movement section, the reception control unit is configured to make a request for the external apparatus to continuously transmit a position of the object in the particular category.

7. The alert control apparatus according to claim 5, wherein
   if it is determined, on a basis of response information for the query information, that an object in a particular category is present within the new movement section, the reception control unit is configured to continuously make a request for the external apparatus to transmit a position of the object in the particular category.

8. The alert control apparatus according to claim 1, wherein
   the particular category is student.

9. The alert control apparatus according to claim 2, further comprising:
   a query control unit configured to control, when the moving body enters the new movement section, a transmission of query information for inquiring with the external apparatus about whether an object in the particular category is present within the new movement section, using the at least one processor, wherein
   if it is determined, on a basis of response information for the query information, that an object in a particular category is present within the new movement section, the reception control unit is configured to perform control for continuously receiving a position of the object in the particular category.

10. The alert control apparatus according to claim 3, further comprising:
    a query control unit configured to control, when the moving body enters the new movement section, a transmission of query information for inquiring with the external apparatus about whether an object in the particular category is present within the new movement section, using the at least one processor, wherein if it is determined, on a basis of response information for the query information, that an object in a particular category is present within the new movement section, the reception control unit is configured to perform control for continuously receiving a position of the object in the particular category.

11. The alert control apparatus according to claim 4, further comprising:
a query control unit configured to control, when the moving body enters the new movement section, a transmission of query information for inquiring with the external apparatus about whether an object in the particular category is present within the new movement section, using the at least one processor, wherein
if it is determined, on a basis of response information for the query information, that an object in a particular category is present within the new movement section, the reception control unit is configured to perform control for continuously receiving a position of the object in the particular category.

12. The alert control apparatus according to claim 9, wherein
if it is determined, on a basis of response information for the query information, that an object in a particular category is present within the new movement section, the reception control unit is configured to make a request for the external apparatus to continuously transmit a position of the object in the particular category.

13. The alert control apparatus according to claim 10, wherein
if it is determined, on a basis of response information for the query information, that an object in a particular category is present within the new movement section, the reception control unit is configured to make a request for the external apparatus to continuously transmit a position of the object in the particular category.

14. The alert control apparatus according to claim 11, wherein
if it is determined, on a basis of response information for the query information, that an object in a particular category is present within the new movement section, the reception control unit is configured to make a request for the external apparatus to continuously transmit a position of the object in the particular category.

15. The alert control apparatus according to claim 9, wherein
if it is determined, on a basis of response information for the query information, that an object in a particular category is present within the new movement section, the reception control unit is configured to continuously make a request for the external apparatus to transmit a position of the object in the particular category.

16. The alert control apparatus according to claim 1, wherein
the moving body is a vehicle.

17. A moving body comprising the alert control apparatus according to claim 1.

18. An alert control method comprising:
controlling an alert by issuing a first alert if an object in a particular category is present within a region to which a moving body is headed, and issuing a second alert if an object in a category other than the particular category is present within the region to which the moving body is headed;
controlling reception by performing, when the moving body enters a new movement section on a movement route, control for receiving a category of an object present within the new movement section from an external apparatus for determining categories of objects on a basis of movement history information of terminals; and
determining, on a basis of an image acquired by an image capturing apparatus equipped in the moving body, whether there is an object for which an alert is to be issued while the moving body is moving within the new movement section, wherein
when the moving body enters the new movement section, the controlling reception includes performing control for receiving, from the external apparatus, a position and a category of the terminal within the new movement section,
the determining includes determining, on a basis of the image, whether an object for which an alert is to be issued is present at the position received from the external apparatus, and
if it is determined that an object for which an alert is to be issued is present at the position received from the external apparatus, the controlling the alert includes performing, on a basis of the category received from the external apparatus, control as to which of the first and second alerts is to be issued.

19. A non-transitory computer-readable storage medium having stored thereon a program that causes a computer to perform operations comprising:
controlling an alert by issuing a first alert if an object in a particular category is present within a region to which a moving body is headed, and issuing a second alert if an object in a category other than the particular category is present within the region to which the moving body is headed;
controlling reception by performing, when the moving body enters a new movement section on a movement route, control for receiving a category of an object present within the new movement section from an external apparatus for determining categories of objects on a basis of movement history information of terminals; and
determining, on a basis of an image acquired by an image capturing apparatus equipped in the moving body, whether there is an object for which an alert is to be issued while the moving body is moving within the new movement section, wherein
when the moving body enters the new movement section, the controlling reception includes performing control for receiving, from the external apparatus, a position and a category of the terminal within the new movement section,
the determining includes determining, on a basis of the image, whether an object for which an alert is to be issued is present at the position received from the external apparatus, and
if it is determined that an object for which an alert is to be issued is present at the position received from the external apparatus, the controlling the alert includes performing, on a basis of the category received from the external apparatus, control as to which of the first and second alerts is to be issued.

* * * * *